Nov. 23, 1943.
J. R. TONEY
2,334,849
MEANS TO FACILITATE PARKING OF VEHICLES
Filed Oct. 1, 1940
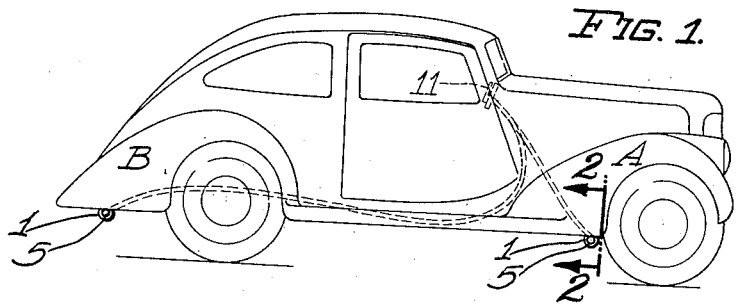
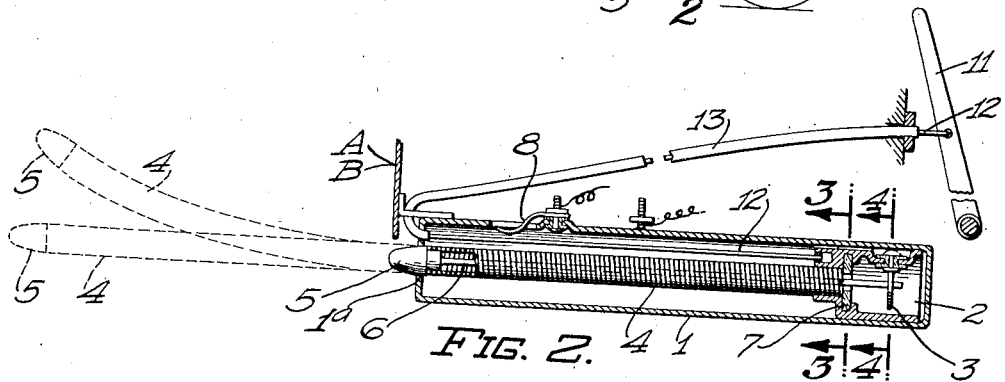
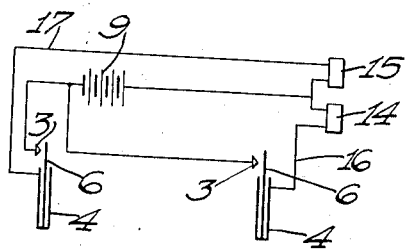
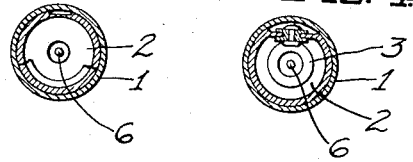
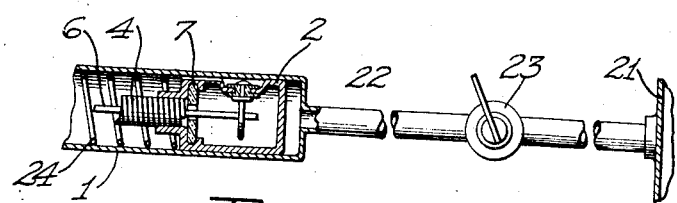
JOHN RAY TONEY. Inventor
By William E. Hall
Attorney Patented Nov. 23, 1943

2,334,849

UNITED STATES PATENT OFFICE 2,334,849

MEANS TO FACILITATE PARKING OF VEHICLES

John Ray Toney, Los Angeles, Calif.

Application October 1, 1940, Serial No. 359,225

9 Claims. (Cl. 200—52)

My invention relates to means to facilitate parking of vehicles, and more particularly to means for vehicles for indicating the nearness of the vehicle to curbs or other outside objects or obstructions.

One of the principal objects of this invention is to provide means of this class in connection with the conventional vehicle, and particularly the conventional passenger automobile, in which the means may be substantially hidden during ordinary observation of the vehicle, but which will register within the driver's compartment of the vehicle the nearness thereof to curbs or other outside objects or obstructions.

Another important object of this invention is to provide means of this class in which the detector or detecting portion of the means may be extended or projected beyond the contour or the side of the vehicle when desired, from its normally inconspicuous position, for registering or indicating the presence or nearness of the vehicle to other objects.

Another important object of this invention is to provide means for separately indicating to the operator of the vehicle when either end thereof is near a curb or other object.

An object also of this invention is the provision of means of this class which is simple and economical of construction, simple and economical to install and to operate, and which will not readily deteriorate or get out of order.

With these and other objects in view, as will appear hereinafter, I have devised an indicating means of this class having certain novel features of construction, combination, and arrangement of parts and portions, as will be hereinafter described in detail and particularly set forth in the appended claims, references being had to the accompanying drawing and to the characters of reference thereon, which form a part of this application, in which:

Fig. 1 is a side elevation of a passenger automobile showing my indicating means, in one form, near the forward and rear ends thereof;

Fig. 2 is an enlarged fragmentary view thereof, taken at 2—2 of Fig. 1, showing portions thereof in section and showing the detector arm by dotted lines in its extended and distorted positions;

Figs. 3 and 4 are transverse sectional views thereof, taken through 3—3 and 4—4 of Fig. 2;

Fig. 5 is a wiring diagram for one form of installation of my indicating means; and, Fig. 6 is a view similar to that shown in Fig. 2, but showing a different means of projecting the indicator beyond its supporting means.

In a simple form of the embodiment of my invention, I have provided flexible arms which may be projected to the side of the vehicle, near the front and rear portion thereof, either or both of which arms, when distorted, indicate such facts upon signalling or registering means in the driver's compartment of the vehicle.

The above mentioned arms are shown as mounted on and normally located within supports 1, which may be tubular in form with an opening 1ª at the outer end. One of these supports is carried by the vehicle below the forward and another below the rear fenders A and B, respectively, of the vehicle, preferably at the lower and rear portions thereof. These supports extend transversely of the vehicle.

Within each support I have shown reciprocally mounted a hollow slide 2 which carries an annular switch member 3 at the middle thereof, this annular member being located transversely of the openings or longitudinal extent of the slide 3 and support 1. The support 1 is grounded to the frame of the automobile and the slide 2 is in electrical contact with the support, but the switch member 3, although carried by the slide, is insulated from the latter. To one end of the slide is secured a long flexible arm 4 which normally extends a slight distance through the opening 1ª of the support 1. The arm is preferably a coil spring member. The outer end of the spring member has a cap or tip 5 which has secured thereto a small diameter metal rod 6 which extends inwardly and axially through the spring member and centrally through the annular switch member 3. The inner portion of the rod 6 is normally located centrally within, or substantially so, by a locating washer 7, which may be made of rubber. This locating washer is located within the inner end of the spring member and normally prevents the vibrating inner end from engaging the annular switch member 3.

When the arm 4 is distorted laterally, the inner end of the rod 6 engages the switch member 3 and forms an electrical contact therewith. This distortion of the arm 4 takes place when the slide 2 is moved to its outward position, as indicated by dotted lines in Fig. 2. When the slide is in its outwardly shifted or projected position, as stated, the supporting portion of the switch member 3 engages a contact 8 at the outer end of the support. This contact 8 is connected with one terminal of the car battery 9. Since the support 1 is grounded with the frame of the automobile and since the other terminal of the battery may be also grounded with such frame, a complete circuit takes place when the rod 6 engages the switch member 3, that is, when the arm 4 is distorted, as stated above.

Since it is desirable only to extend or project the end of the curb detecting arm laterally or horizontally from the vehicle, it is obvious that the arm 4 itself or the tube or support 1 need not be wholly horizontal, but it may be inclined slightly downwardly or angularly towards its outer end.

In the driver's compartment of the vehicle and preferably on the instrument board thereof, is provided a suitable means for manually projecting the flexible arm 4 from the support 1. Such means is shown, in Figs. 2, 3, and 4, as consisting of a hand operated lever 11 which is connected by a wire 12 to the slide 2. This wire is preferably enclosed in an armored tube 13, which tube, together with the wire 12, provides a Bowden cable control. When the lever 11 is shifted clockwise, that is, in the direction of the arrow indicated in Fig. 2, the slide 2 is shifted outwardly and the flexible arm 4 is projected beyond the contour or outer side of the fender. When the lever is returned to its original position, as shown, the wire 12 is sufficiently rigid so that the slide 2 is shifted to its original solid line position.

In parking an automobile, it is desirable to extend or project the detectors or indicator arms at both ends of the vehicle. Therefore, a unitary means 11 may be employed to project both of the detectors or indicator arms from the vehicle.

On the instrument board of the automobile is preferably provided separate signalling or registering devices 14 and 15, which are connected by separate circuits 16 and 17, respectively, to the indicators or detectors at the forward and rear fenders A and B so that it is quickly apparent to the operator of the automobile which end of the same is nearest the curb or other obstruction.

In Fig. 6 of the drawing is shown a slightly modified form of the manual means for projecting the arm 4 from the support 1. This means is shown as a pneumatic means and consists of a compressed air tank 21 which is connected to the support 1 by a flexible tube 22. In this tube is inserted a control valve 23 which may be located on the instrument board of the vehicle. When the valve is open, air pressure is forced from the tank 21 into its support 1 behind the slide 2, the two latter members, in this instance, being in the form of a cylinder and piston, respectively.

Though I have shown and described a particular construction, combination, and arrangement of parts and portions, and certain modifications thereof, I do not wish to be limited to the same, but desire to include in the scope of my invention the construction, combination, and arrangement substantially as set forth in the appended claims.

I claim:

1. In a means of the class described, the combination with a vehicle, of a support on the vehicle, a switch mounted on the support and provided with an extended movable arm, said arm being extensible from a retracted position substantially within the contour of the vehicle to a position horizontally outwardly therefrom, and manual means for temporarily projecting said arm with respect to the support beyond the vehicle, said arm causing closing of the switch when the arm is moved while in its projected position.

2. In a means of the class described, the combination with an automobile having a fender at its side, of a support mounted on the vehicle below and within the contour of the fender, a switch mounted on the support and provided with an extended movable arm, and manual means for temporarily projecting said arm with respect to the support beyond the contour of the fender, said arm causing closing of the switch when the arm is moved in its projected position.

3. In a means of the class described, the combination with a vehicle, of a support on the vehicle, a switch slidably mounted on the support and provided with a flexible arm capable of closing the switch when the arm is distorted, said arm being extensible from a retracted position substantially within the contour of the vehicle to a position horizontally outwardly therefrom, and manual means for temporarily projecting said arm beyond the vehicle.

4. In a means of the class described, the combination with an automobile having a fender at its side, of a supporting guide mounted on the vehicle below the fender, a switch slidably mounted on the supporting guide and provided with a flexible arm, the outer end of the arm being normally positioned within the contour of the fender, and manual means for temporarily projecting the arm beyond the fender, said arm, when projected by the latter means, being capable of closing the switch by distortion of the arm.

5. In a means of the class described, the combination with a vehicle, of a support on the vehicle, a switch slidably mounted on the support, said switch having a flexible arm and switch members in connection with the flexible arm, said arm causing contact of the switch members with each other when the arm is distorted, said arm being extensible from a retracted position substantially within the contour of the vehicle to a position horizontally outwardly therefrom, and manual means for temporarily projecting said arm beyond the vehicle.

6. In a means of the class described, the combination with a vehicle, of a support on the vehicle, an arm mounted to move longitudinally on and with respect to the support and extensible with one end beyond the support and the vehicle, manual means for temporarily projecting said arm to said extended position, and a switch in association with said arm, adapted to be closed by lateral movement of the arm.

7. In a means of the class described, the combination with a vehicle, of a support on the vehicle, an arm mounted to move on the support and extensible with one end beyond the vehicle, manual means for temporarily shifting said arm to said extended position, and a switch in association with said arm, adapted to be closed when the arm is extended outwardly.

8. In a means of the class described, the combination with a vehicle, of a detector for the side of the vehicle, said detector having a flexible arm so mounted on the vehicle as to be extended to a fixed position outwardly from the vehicle, manual control means for projecting said arm in said direction to said extended position, and a switch in connection with the arm adapted to be closed when the arm is distorted.

9. In a means of the class described, the combination with a vehicle, of a detector for the side of the vehicle, said detector having a flexible arm so mounted on the vehicle as to be extended outwardly beyond the vehicle, means for temporarily fixedly positioning the arm outwardly to engage an object beyond the contour of the vehicle as the vehicle moves toward the object, and a switch in connection with the arm adapted to be closed when the arm is distorted by the object.

JOHN RAY TONEY.